United States Patent
Jafarzadeh et al.

(10) Patent No.: US 9,294,670 B2
(45) Date of Patent: Mar. 22, 2016

(54) LENTICULAR IMAGE CAPTURE

(71) Applicant: Amazon Technologies, Inc., Reno, NV (US)

(72) Inventors: Ario Jafarzadeh, Seattle, WA (US); Charles Eugene Cummins, Seattle, WA (US); Nicholas Ryan Gilmour, San Jose, CA (US); John Matthew Nance, Seattle, WA (US); Mihir Kumar Choudhary, San Jose, CA (US); Vivek Shah, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 76 days.

(21) Appl. No.: 14/164,027

(22) Filed: Jan. 24, 2014

(65) Prior Publication Data
US 2015/0215526 A1  Jul. 30, 2015

(51) Int. Cl.
  *H04N 5/232* (2006.01)
  *G06F 3/01* (2006.01)
  *G06F 3/0346* (2013.01)

(52) U.S. Cl.
  CPC ............ *H04N 5/23222* (2013.01); *G06F 3/012* (2013.01); *G06F 3/017* (2013.01); *G06F 3/0346* (2013.01); *H04N 5/23216* (2013.01); *H04N 5/23293* (2013.01)

(58) Field of Classification Search
  CPC ............ H04N 1/2125; H04N 5/23216; H04N 5/23222; H04N 5/23293; G06F 3/005; G06F 3/011; G06F 3/012; G06F 3/017; G06F 3/0346; G06F 17/30265; G06F 17/30268
  See application file for complete search history.

(56) References Cited

U.S. PATENT DOCUMENTS

| 6,894,719 | B2 * | 5/2005 | Blish et al. ............. 348/207.99 |
| 8,708,817 | B1 * | 4/2014 | de la Carcova ................. 463/31 |
| 8,736,666 | B2 * | 5/2014 | Ishida ............... 348/39 |
| 2002/0100199 | A1 * | 8/2002 | Bean ............... A47G 1/141 40/720 |
| 2003/0128287 | A1 * | 7/2003 | Fredlund et al. ......... 348/333.02 |
| 2004/0046885 | A1 * | 3/2004 | Regan et al. ............ 348/333.11 |
| 2004/0157195 | A1 * | 8/2004 | Andresen .................... 434/130 |
| 2007/0046630 | A1 * | 3/2007 | Hong ................... G06F 1/1626 345/158 |
| 2007/0263071 | A1 * | 11/2007 | Lee et al. .................. 348/14.02 |
| 2008/0062283 | A1 * | 3/2008 | Matsushita et al. ...... 348/231.99 |
| 2009/0234473 | A1 * | 9/2009 | Andersson ...................... 700/94 |
| 2012/0113216 | A1 * | 5/2012 | Seen et al. ..................... 348/38 |
| 2012/0314899 | A1 * | 12/2012 | Cohen et al. ................. 382/103 |

(Continued)

OTHER PUBLICATIONS

USPTO Non-Final Office Action dated Jun. 22, 2015 for U.S. Appl. No. 14/164,046, 13 pages.

*Primary Examiner* — Daniel M Pasiewicz
(74) *Attorney, Agent, or Firm* — Hogan Lovells US LLP

(57) ABSTRACT

The display of images, such as lenticular images, in a limited display space can be aided through the use of motion-based control, whereby a user can rotate and/or translate a computing device in order to cause different views of a lenticular image to be displayed. Sensors can be used to determine the motion in order to select the appropriate view to display. Approaches can further assist the user in creating lenticular images. The user can specify various configurations in which to display different views in a lenticular. If the user is capturing the images, one or more previously-acquired images can be used as a guide to help the user to align the images. Various processing can be performed to cause the individual views of the lenticular to match as closely as possible in factors such as alignment, brightness, and color range, among other such options.

20 Claims, 14 Drawing Sheets

(56) References Cited

U.S. PATENT DOCUMENTS

| | | | |
|---|---|---|---|
| 2013/0038759 A1* | 2/2013 | Jo et al. | 348/240.99 |
| 2013/0070143 A1* | 3/2013 | Jang et al. | 348/333.05 |
| 2013/0155187 A1* | 6/2013 | Skyberg | 348/46 |
| 2013/0241925 A1* | 9/2013 | Konami et al. | 345/419 |
| 2014/0132705 A1* | 5/2014 | Kira et al. | 348/36 |
| 2014/0247325 A1* | 9/2014 | Wu | H04N 5/23206 348/39 |
| 2015/0213784 A1 | 7/2015 | Jafarzadeh et al. | |
| 2015/0215532 A1* | 7/2015 | Jafarzadeh | H04N 5/23293 348/36 |

* cited by examiner

LENTICULAR IMAGE CAPTURE

BACKGROUND

As people are increasingly utilizing portable computing devices, such as smart phones and tablets, to perform a variety of tasks, there is a need to improve the interfaces and capabilities provided by these and other such devices. For example, users are increasingly using their portable computers to capture images and video, instead of using conventional digital cameras. Problems exist, however, in that it can be difficult for at least some users to capture and/or create images that show different but aligned views of an object using a portable computing device. Further, conventional approaches to displaying images on these devices can impact the ability of a user to compare these views across multiple images.

BRIEF DESCRIPTION OF THE DRAWINGS

Various embodiments in accordance with the present disclosure will be described with reference to the drawings, in which.

DETAILED DESCRIPTION

Figure 1:
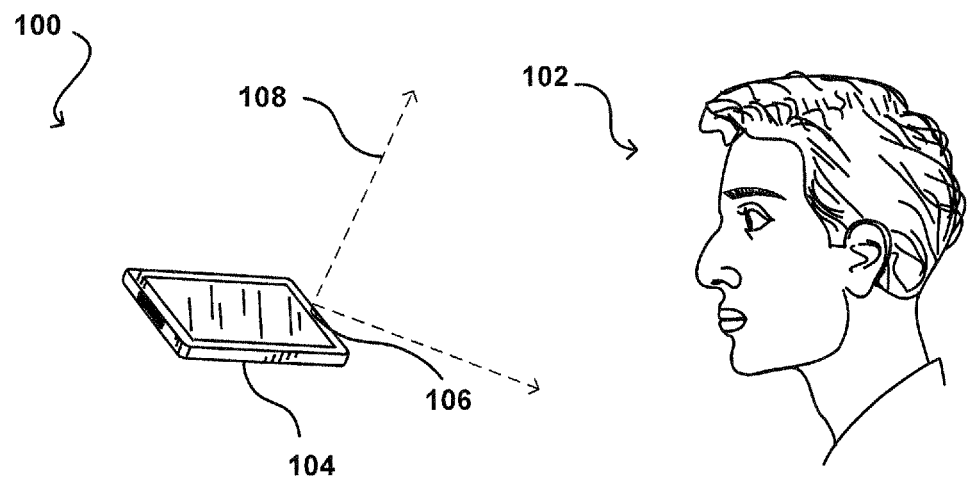
FIG. 1 illustrates an environment in which a user is able to view images displayed on an electronic device in accordance with various embodiments.

Systems and methods in accordance with various embodiments of the present disclosure may overcome one or more of the aforementioned and other deficiencies experienced in conventional approaches to acquiring and/or displaying images using an electronic device. In particular, various embodiments enable users to create lenticular images from a series of images acquired by a computing device. Similarly, various embodiments provide interfaces that enable users to easily identify these images, as well as to display different views of the images.

In various embodiments, a user might have one or more lenticular images stored (at least temporarily) on a computing device. In order to enable to obtain different views of a lenticular image, the user can change the relative orientation of the device to the user, whether by moving the computing device, the user, or both, among other navigational options. In at least some embodiments, a motion and/or orientation sensor of the computing device can determine an amount and direction of the motion, which can cause a different view of the lenticular to be displayed, where that view is associated with the direction and amount. If viewed in a gallery, such an approach can enable a user to quickly determine which images are lenticulars, and can enable the user to also obtain different views of those lenticulars without opening each individual image. The lenticular can have two or more individual images combined in different directions in order to enable different views to be displayed according to different motions. Information about the arrangement of the views can be stored with the lenticulars, in order to provide guidance as to how to change views with motions in different directions. Various other approaches for changing views can be used as well, such as may include using a mouse or cursor of the computing device, performing a swipe of a touch screen, performing a swipe gesture, or issuing a voice command, among others.

Approaches in accordance with various embodiments can also attempt to assist a user in capturing and/or creating lenticular images. In at least some embodiments, a user can capture multiple images as part of a lenticular creation process, or can utilize images that have already been obtained and/or stored on the device. An interface can enable the user to position the images such that specific motions will cause specific individual images, referred to herein as different "views," to be displayed. The user can also indicate whether the views continue to change as the user continues to rotate a device in a specific direction, or whether a single view is associated with a single direction. If the user is capturing images for use with the lenticular, the user can in at least some embodiments indicate a position for that image before the individual image is captured. A guide can be provided to help the user align the image to be captured, where the guide can include a partially transparent view, outline, bounding region, or other such graphical element derived from one of the other views in the lenticular, such as the most recently captured (or added) image or the initial image. In some embodiments, the user might be able to choose which image is used as a guide for image capture. Such an approach enables the user to align images where those images show different views of a common object, for example, or where alignment is otherwise desired. In at least some embodiments, a user can also edit existing lenticular images, such as to add, remove, rearrange, or edit individual images contained in the lenticular.

Various other applications, processes and uses are presented below with respect to the various embodiments.

FIG. 1 illustrates an example situation 100 wherein a user 102 is attempting to view one or more images displayed on a computing device 104. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture of one or more objects, such as the user 102, contained within a field of view of the image capture element. Each image capture element may be, for example, a charge-coupled device (CCD), a motion detection sensor, or an infrared sensor, or can utilize another appropriate image capturing technology. The device can include other sensors for capturing information as well, such as at least one microphone operable to capture audio data, a motion sensor for detecting motion, an orientation sensor for determining device orientation, and/or a position sensor for acquiring position data, such as geo-data, among others.

Figure 2:
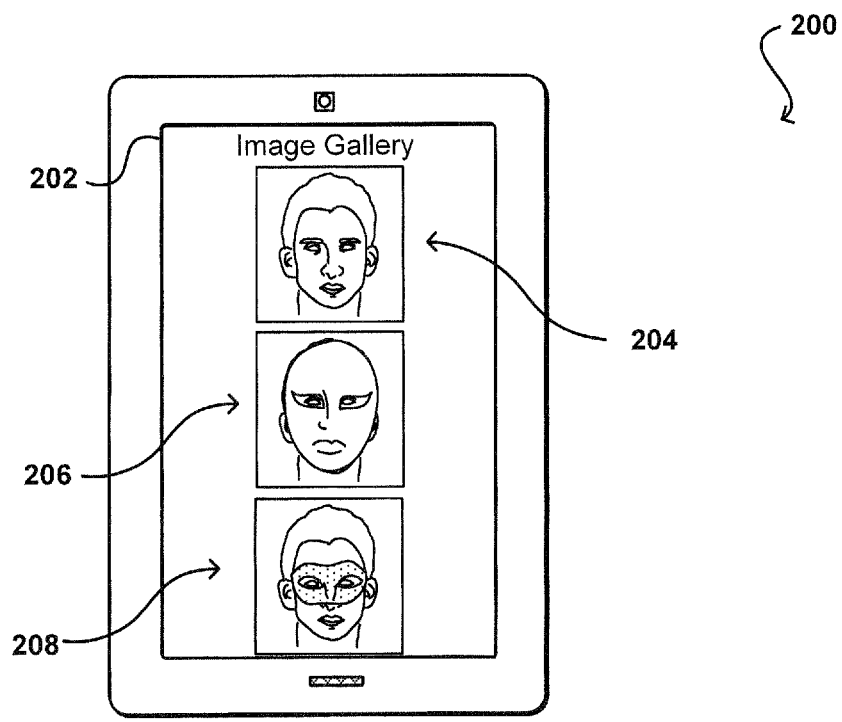
FIG. 2 illustrates an example display of images that can be generated in accordance with various embodiments.

FIG. 2 illustrates an example interface display 200 that can be provided to a user in such a situation, in accordance with various embodiments. In this example, the user has accessed an image gallery or other collection of images to be displayed on a display screen 202 of a computing device. The images can correspond to at least a subset of images stored in a particular location, relating to a particular topic, or otherwise associated by one or more topics or categories, for example. In this example, the images in the image gallery correspond to different views of an object, in this case the head of a person. As illustrated, a first image 204 illustrates the head of a user without a mask. The second image 206 shows the person wearing a first mask, and the third image 208 shows the person wearing a second mask. While such an approach enables a user to obtain different views of the person, it does not enable a direct comparison of the views. Further, such an approach requires the user to keep track of all the images to be compared, which in some cases might be stored in different locations on the device. If the user wants to share the views, the user must also manually share each individual image. Various other deficiencies with such an approach exist as well.

Approaches in accordance with various embodiments overcome at least some of these and other conventional approaches to image management by enabling users to combine multiple images into a single lenticular image, which can enable a user to access multiple individual images, herein referred to as "views," from a single image file. A lenticular image, as used herein, generally refers to an image that changes in appearance when viewed from different angles. For example, a lenticular image can include multiple individual images, or image views, which can be separately accessed through an appropriate interface. In at least some embodiments a user can access different views of a digital lenticular image through motion of the computing device in different directions, among other such options as discussed and suggested herein.

Figure 3A:
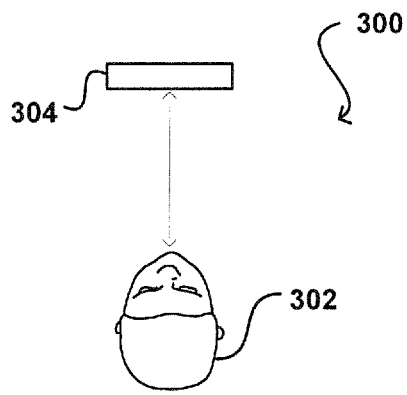
FIGS. 3(a), 3(b), 3(c), 3(d), 3(e), and 3(f) illustrate an example approach to displaying different views of a lenticular image based at least in part upon a relative orientation of a user that can be utilized in accordance with various embodiments.
Figure 3B:
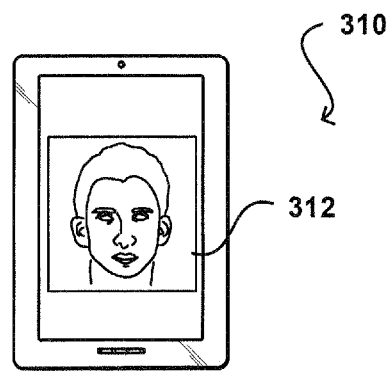

For example, FIGS. 3(a) through 3(f) illustrate an example approach to displaying different views of a lenticular image based on device motion that can be utilized in accordance with various embodiments. FIG. 3(a) represents an initial configuration 300 wherein a user 302 is generally looking straight on (at a normal to the display screen of the computing device 304). Such a relative orientation can be referred to as a default orientation, and can be used to display the initial view of a lenticular image. As mentioned herein, a lenticular image can have a default or initial view, which can be the first view presented when a lenticular image is displayed. It should be understood that other relative orientations can be used with the default view as well. As illustrated in the example situation 310 of FIG. 3(b), an initial view 312 of a lenticular image is displayed when the lenticular is first displayed and/or the device is in the default orientation. In this example, as in the previous example, the default view corresponds to a person without a mask.

Figure 3C:
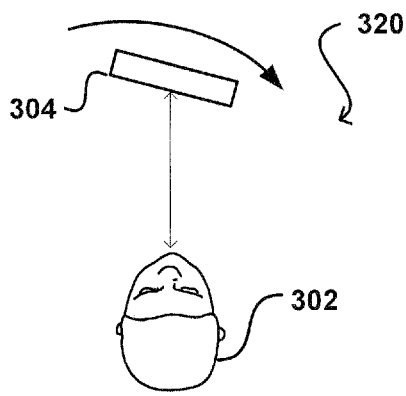
Figure 3D:
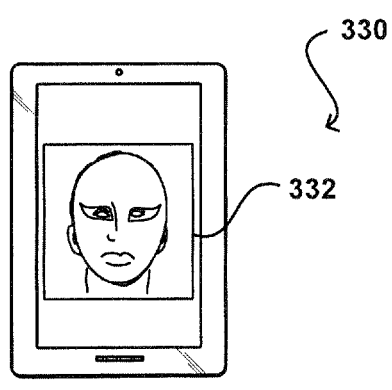
Figure 3E:
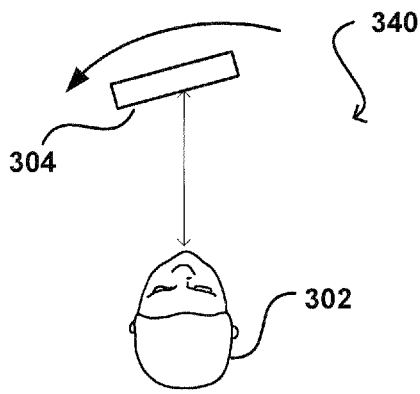

If the user wants to see what the person would look like wearing one of the masks, the user can change the relative orientation of the device 304, such as is illustrated in the example situation 320 of FIG. 3(c). In this example, the user 302 has rotated the device in a first direction, such as along a y- or vertical-axis running through a central portion of the computing device 304. It should be understood that other motions of the device can also be used, as well as motions of the user or other such inputs as discussed elsewhere herein. Further, such views are not views of different objects, as is possible in various lenticulars, but are views corresponding to different contexts of a single object, here a person. As with physical lenticular images, making a rotation of at least a certain angle (or within a certain range of angles) can cause a different view to be visible. Similarly, in this example the user rotating the device in a specific direction by at least a certain angular amount can cause a second view 332 to be displayed, such as is illustrated in the example situation 330 of FIG. 3(d). In this example, the view of the person includes the person wearing the first mask. The user can flip back and forth between the view without the mask and the view with the first mask by rotating the device back and forth about the specified axis, for example, such as between the orientations of FIG. 3(a) and FIG. 3(c). Such an approach can be useful, as the user can readily view the difference between the user wearing the mask and not wearing the mask. Such an approach is also beneficial as both views are contained within the same image file, such that the user does not have to locate, or keep track of, the separate individual images.

Figure 3F:
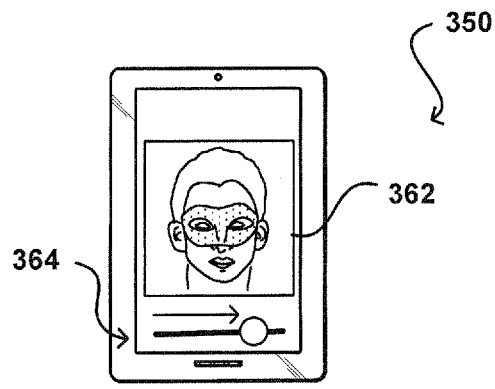

It might be the case, however, that the user has multiple images that the user wants to compare. Accordingly, approaches in accordance with various embodiments enable a user to create and/or edit lenticular images to include three or more images. In some embodiments, a user might be able to add as many individual images to a lenticular image as is practical, etc. For example, the user might want to see how the person looks in a second mask, and be able to compare that image as well. Accordingly, the lenticular image can be created such that when the user rotates the device 304 in a second direction (past the default orientation) as illustrated in the example situation 340 of FIG. 3(e), a third image 362 of the person showing the person in the second mask can be displayed, as illustrated in FIG. 3(f). The user can then utilize the rotation of the device to control which image is displayed, and the rate at which the view changes. Other types of views can be utilized as well, such as views with different lighting conditions, camera settings, and the like. In at least some embodiments, an interface element such as a slider bar 364 or other such element can be utilized to convey to the user a sense of how the view correlates to the lenticular image. In this example, the slider of the slider bar can move left and right with the change in view, such that the user can tell how close the current view is to the default or either of the end views of the lenticular image. Other approaches can be used to indicate to the user that the user has reached an end of a lenticular image, such as by causing the computing device to provide audible or haptic feedback, or by causing the image to bounce, flash, or utilize a bounce back motion, among other such options.

There can be various approaches to updating the views in response to device rotation or other such movement. For example, considering a lenticular with three images as in the previous example, rotating in a first direction might only display a certain view, while rotating in the opposite direction would display a different view. In some embodiments, there might be a range of angles assigned to each view. For example, the view might be configured to change every five degrees. If the device is in the default orientation +/−2.5 degrees (i.e., from where orientation determination started or with respect to the user), the initial view can be displayed. If the device is rotated in a first direction by an amount between 2.5 and 7.5 degrees, a second view can be displayed. If the device is rotated in that direction between 7.5 and 12.5 degrees, yet another view can be displayed, which depending on the embodiment can correspond to the third view, the first view, or a different view as discussed and suggested herein. A similar approach can be utilized with rotation in the opposite direction, as well as with other such motions. Such an approach can enable the user to move between views in the order desired, and to be able to compare images in different orders, among other such advantages.

Figure 4A:
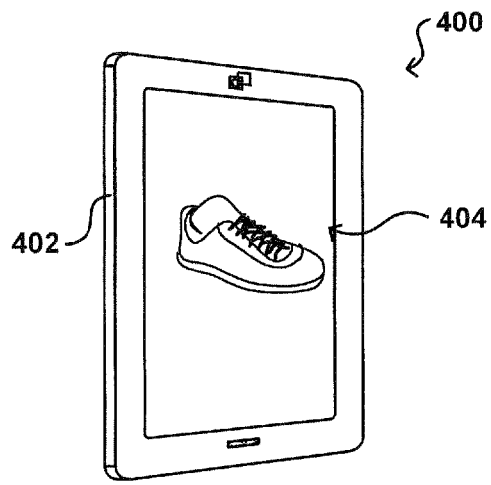
FIGS. 4(a), 4(b), 4(c), 4(d), 4(e), and 4(f) illustrate an example approach to displaying views of a lenticular image based at least in part upon changes in orientation of the device displaying the image that can be utilized in accordance with various embodiments.
Figure 4B:
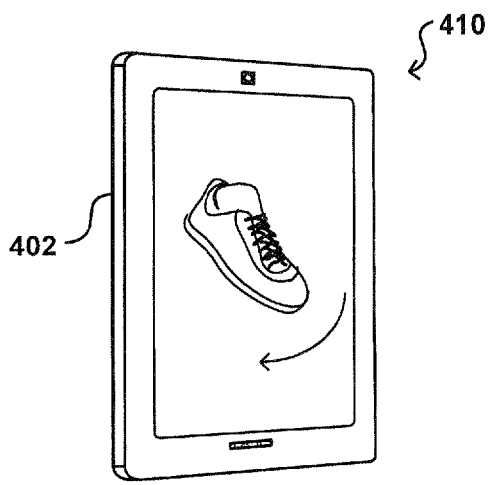
Figure 4C:
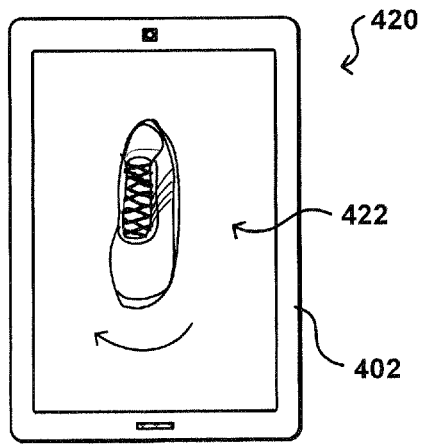
Figure 4D:
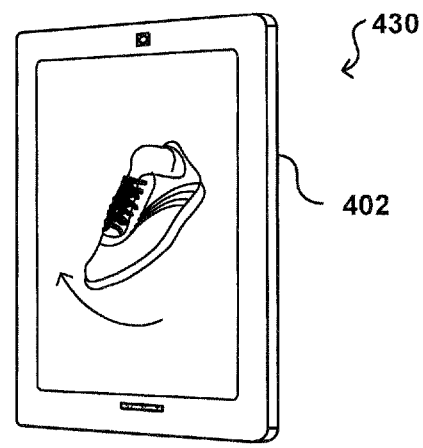
Figure 4E:
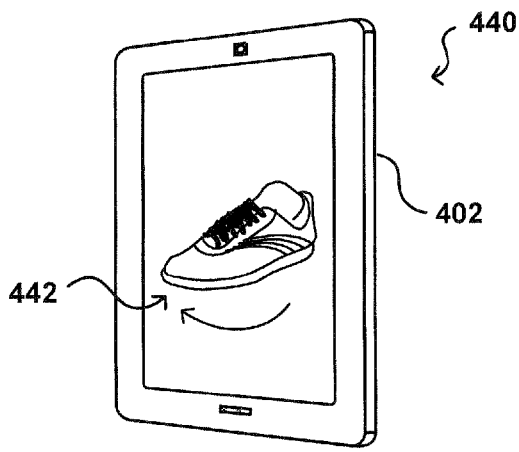
Figure 4F:
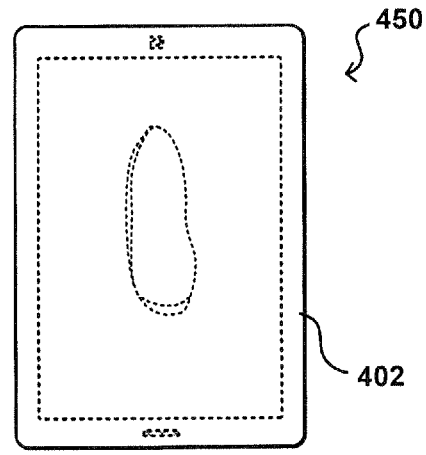

FIGS. 4(a) through 4(f) illustrates another example of a lenticular image that can display different views in accordance with various embodiments. In this example, the views are used to obtain different angles of a single object, in this case a shoe, which helps the user to get a better understanding of the appearance of the shoe than a single image, and can provide a more interactive and intuitive experience than providing the user with a set of separate images. Although the present example is described with respect to moving a single camera around an object, it should be understood that if a device has multiple cameras then multiple views of an object can be obtained concurrently. These can be used as separate views in a lenticular or for a single stereoscopic view of a lenticular, among other such options. For example, the cameras can be used to obtain disparity information that can be used to generate three-dimensional models of an object for purposes of interpolation or blending to generate additional views as discussed elsewhere herein. In the example situation 400 of FIG. 4(a) the computing device 402 is rotated in a first direction, which causes a right side view 404 of a show to be displayed to the user. As the device is rotated toward the "default" or similar orientation, the view in the example situation 410 of FIG. 4(b) moves towards the straight on, front, or top view 422 of the shoe is displayed, as illustrated in the example situation of FIG. 4(c). In the example situation 430 of FIG. 4(d), the device 402 is further rotated such that a view towards the left side of the shoe is displayed. The device can be further rotated to obtain a further left side view, as illustrated in the example situation 440 of FIG. 4(e). Additional views can be included as well, such as may show back views, bottom views, and the like. For example, the situation 450 illustrated in FIG. 4(f) shows the device rotated all the way such that the back of the device is facing forward, which could result from the user walking "around" a virtual object to get a three-dimensional view. As illustrated, the view can show the back or bottom of the shoe, for example, which can enable the user to get a virtual three-dimensional view of the object.

Further additional side views can be included to show different angles. For example, there might be twelve views instead of three or six, which can provide more views from different angles. Such an approach can enable a user to obtain a quasi-three-dimensional view, as the user can rotate the device to get a full and/or partial view around an object. If the user prefers, in some embodiments the user can actually walk around a location while pointing the device at that location in order to obtain what appears to be a realistic three-dimensional view. Interpolation or other transition effects (e.g., crossfade) can be used as well to help increase the realism of the view.

As mentioned, in some embodiments an attempt can also be made to generate interstitial images that would appear between the captured image views in the lenticular. For example, interpolation or blending can be used between adjacent views in the lenticular to attempt to generate intermediate views, which can help to increase the three-dimensional or virtual object experience. The interstitial views can be generated and included in the lenticular image itself, or can be generated dynamically at a time of viewing of the lenticular image, among other such options.

Figure 5A:
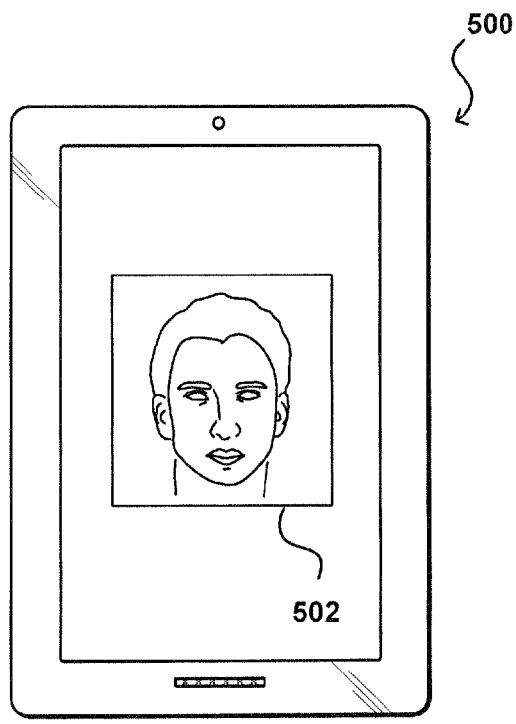
FIGS. 5(a), 5(b), 5(c), and 5(d) illustrate an example approach to displaying portions of an image based at least in part upon changes in orientation of the device displaying the image that can be utilized in accordance with various embodiments.
Figure 5B:
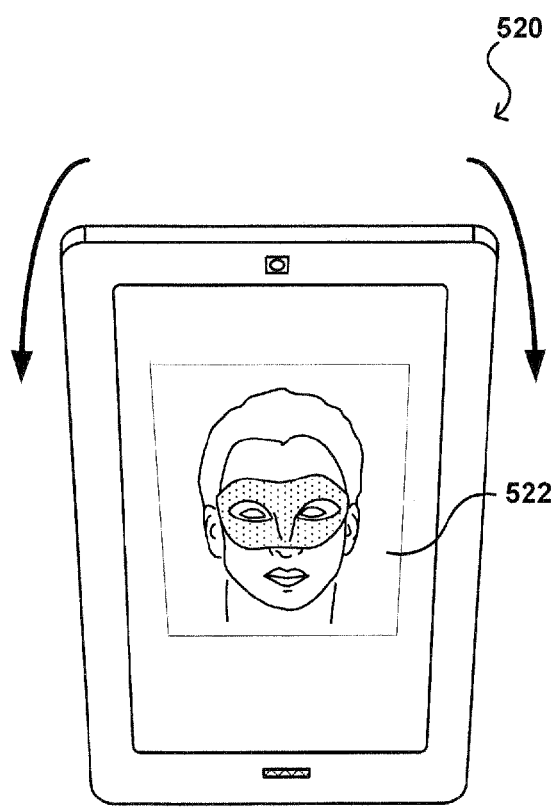
Figure 5C:
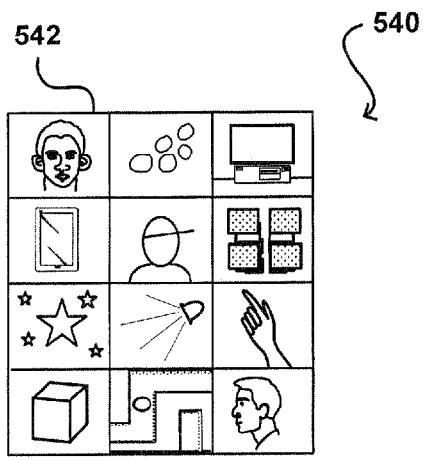
Figure 5D:
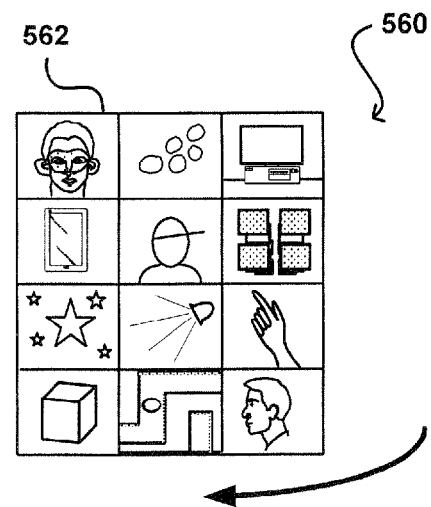

A lenticular image can also allow for views for other directions, movements, or motions as well within the scope of the various embodiments. For example, FIGS. 5(a) and 5(b) illustrate situations 500, 520 wherein different views 502, 522 can be displayed by rotating the device in a different direction, in this case along a horizontal or x-axis. In some embodiments, a user can obtain different views by rotating about different axes, such as by rotating along the x-axis to obtain a first view and then rotating along the y-axis to obtain a second view. Various combinations of rotations can be used to obtain different views, which can also enable direct comparisons of different views in the lenticular. Various other motions can be used to cause different views to be displayed. These can include, for example, translating the device in a forward or backward motion, swiping across a touch screen, tabbing to cycle through the views, etc. In some embodiments, motions such as lateral translations can perform other actions, such as to zoom in or out of a view, change a brightness, etc. As mentioned, the ability to change views in a lenticular image can also be beneficial when the image is displayed in an image gallery or other such interface. For example, in the situation 540 of FIG. 5(c) a plurality of images are displayed. Using a conventional approach, no other views of the lenticular 542 would be displayed in the image gallery, such that a user would not be able to determine which of the images (if any) are lenticulars without separately opening each image. Using approaches discussed herein, however, a user can adjust a relative orientation as illustrated in the example situation 560 of FIG. 5(d), which can cause a different view to be displayed. In this way, a user can quickly identify the lenticular 562 as well as determine which lenticular contains the desired view.

Such an approach to displaying lenticulars can be useful with image galleries or other concurrent displays of multiple images on a computing device. For example, a set of twelve images might be displayed, three of which correspond to lenticular images. A user viewing such a gallery using a conventional approach might not be able to easily identify which images are lenticulars. Further, if the user is looking for a specific view contained in one of the lenticulars, the user might not be able to locate that view unless that view is a default for the lenticular or the user opens each individual lenticular until the view is located. Accordingly, approaches in accordance with various embodiments can enable the user to rotate the device to view different views of the lenticulars while in the gallery view.

Figure 6:
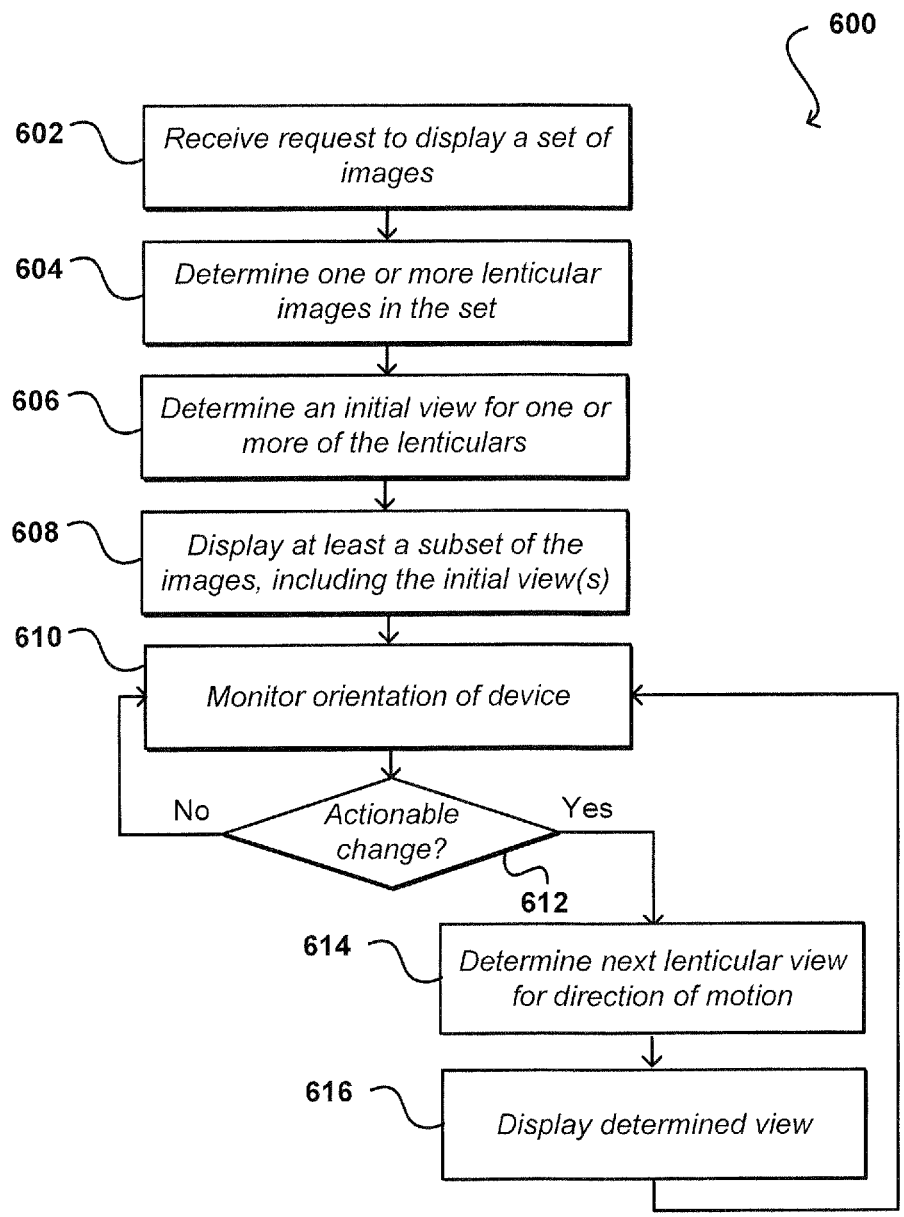
FIG. 6 illustrates an example process for updating the displayed view of one or more lenticular images that can be used in accordance with various embodiments.

As an example, FIG. 6 illustrates an example process 600 for controlling the displayed views of a lenticular panoramic image in set of image previews that can be utilized in accordance with various embodiments. It should be understood that, for any process discussed herein, there can be additional, fewer, or alternative steps performed in similar or alternative orders, or in parallel, within the scope of the various embodiments unless otherwise stated. Further, as discussed elsewhere herein such an approach can be utilized when only a single lenticular image is displayed, among other such options. In this example, a request to display a set of images is received 602, such as to display a set of preview thumbnails for at least a subset of a plurality of images corresponding to the request. A determination can be made 604 to identify one or more lenticular images corresponding to the request. For each lenticular image to be displayed, an initial view to be displayed can be determined 606. As discussed, this can be specified as the initial image in the metadata of the lenticular image, for example, or can be determined based upon the relative orientation of the computing device to the user, among other such options. At least a subset of the images can be displayed 608, including the initial view for any of the lenticular images to be displayed. The number of images to be displayed can be fixed for the image gallery or determined using factors such as the resolution and size of the display screen, among other such options.

While at least a subset of the images is being displayed, the device can monitor 610 changes in relative orientation, such as may be based upon rotations or translations of the computing device or motions of a user, among other such options. For each change, a determination can be made 612 as to whether the change is an actionable change. For example, a user might be allowed to make small changes in orientation of the device due to the user holding the device in the user's hands, without causing a change in the content displayed. Similarly, a user might be able to make small adjustments to the user's head position without changing the content displayed. In at least some embodiments, one or more actionable change thresholds might be used to determine when to update content. For example, the relative orientation of the device with respect to the user might have to change by at least one degree before updating the display of content. In other embodiments there might not be any such threshold or criterion, and the content might be updated with any detectable change in orientation, position, viewing angle, etc. If the change is determined to be an actionable change, the view to be displayed for that direction of motion for each lenticular image can be determined 614, and the appropriate view(s) displayed 616. In some embodiments where different lenticulars have different numbers of views or update instructions, a rotation of a certain number of degrees, such as three degrees in a given direction, might cause the view to change in one or more of the lenticulars, while not changing for other lenticulars. In some embodiments, the lenticulars when displayed in a gallery can be configured to change together, such that the user does not mistakenly think there to be fewer lenticular images because only a subset of the views updated based upon the rotation angle. Various other approaches can be utilized as well within the scope of the various embodiments. Such approaches enable a user to quickly identify the lenticular images through device rotation, for example, and can enable the user to ascertain the different views contained in multiple lenticulars without having to open each individual lenticular and cycle through the individual views of each.

As mentioned, there can be various ways to determine changes in relative orientation in accordance with the various embodiments. For example, a computing device might include one or more sensors that can detect changes in motion, direction, and/or orientation. These can include, for example, an inertial sensor, an electronic compass, a gyroscope, an accelerometer, a distance sensor, a proximity sensor, a global positioning system component, and the like. In some embodiments, changes in the orientation of a computing device are used independent of the viewing position of a user. For example, a default view can be initially displayed, with the current orientation of the device being used as a frame of reference. Any rotation, translation, or other change in orientation with respect to that frame of reference can be used to update the view that is displayed. For example, a rotation of five or ten degrees in one direction might cause the different view to be displayed.

Figure 7A:
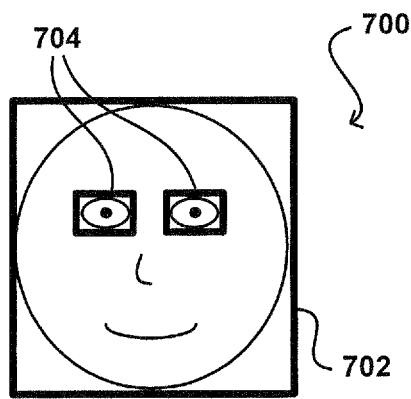
FIGS. 7(a), 7(b), 7(c), and 7(d) illustrate example approaches to performing head tracking that can be used in accordance with various embodiments.

It might be the case, however, that the user and the device move together, such that the relative orientation has not changed and the user would expect the display to not change, such as when the user is in an automobile or swivel chair. Accordingly, in some embodiments at least one camera or other sensor can attempt to determine the relative location of a user, in order to determine changes in relative orientation of the computing device with respect to the user. Various approaches can be utilized for locating one or more desired features of a user's face to determine various aspects useful for determining relative orientation. For example, an image can be analyzed to determine the approximate location and size of a user's head or face. FIG. 7(a) illustrates an example wherein the approximate position and area of a user's head or face 700 is determined and a virtual "box" 702 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 704 of each of the user's eyes (or in some cases the eyes in tandem). By determining the location of the user's eyes as well. advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Figure 7B:
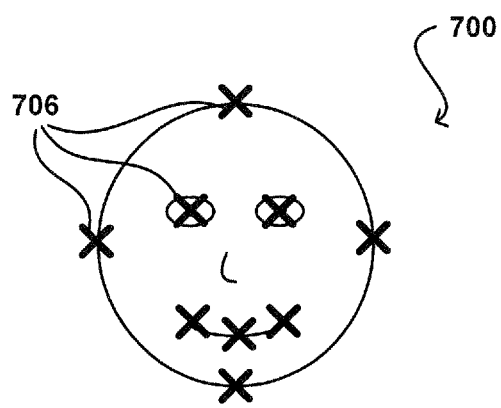

Various other algorithms can be used to determine the location of features on a user's face. For example, FIG. 7(b) illustrates an example wherein various features on a user's face are identified and assigned a point location 706 in the image. The system thus can detect various aspects of user features and can determine more subtle changes in orientation. Such an approach provides advantages over the general approach of FIG. 7(a) in certain situations, as various other features can be determined, in case the user's eyes cannot be seen due to glasses, hair, etc.

Figure 7C:
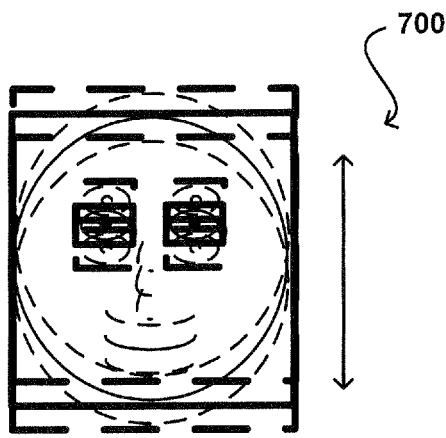
Figure 7D:
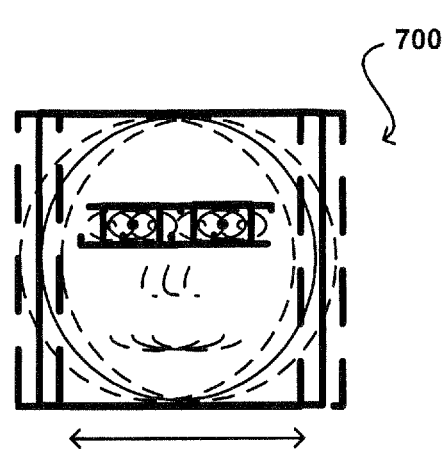

Once the positions of facial features of a user are identified, relative motion between the user and the device can be detected and utilized as input. For example, FIG. 7(c) illustrates an example where the user's head 700 is moving up and down with respect to the viewable area of the imaging element. As discussed, this could be the result of the user moving his or her head, or the user moving the device up and down, etc. FIG. 7(d) illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements.

In some embodiments, a computing device can determine and track an approximate area or region of interest corresponding to the user's eyes, or another such feature, in the captured images such that an algorithm of the computing device only has to analyze image data corresponding to that region, which can significantly reduce the amount of processing needed for images, particularly for high resolution, full color images.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred.

As mentioned, it can be desirable in at least some embodiments to utilize at least two imaging elements (i.e., stereoscopic imaging) to determine the location of the user, as well as to capture image information to be displayed. In almost all situations the position of an imaging element will be offset from the eye of a user, such that some image translation and viewing angle adjustments may need to be made to ensure the consistency of the displayed image. Particularly for applications such as image stabilization from the point of view of the viewer, it can be important to compensate for differences in viewing angle resulting from the camera being offset from the user's eye.

Figure 8A:
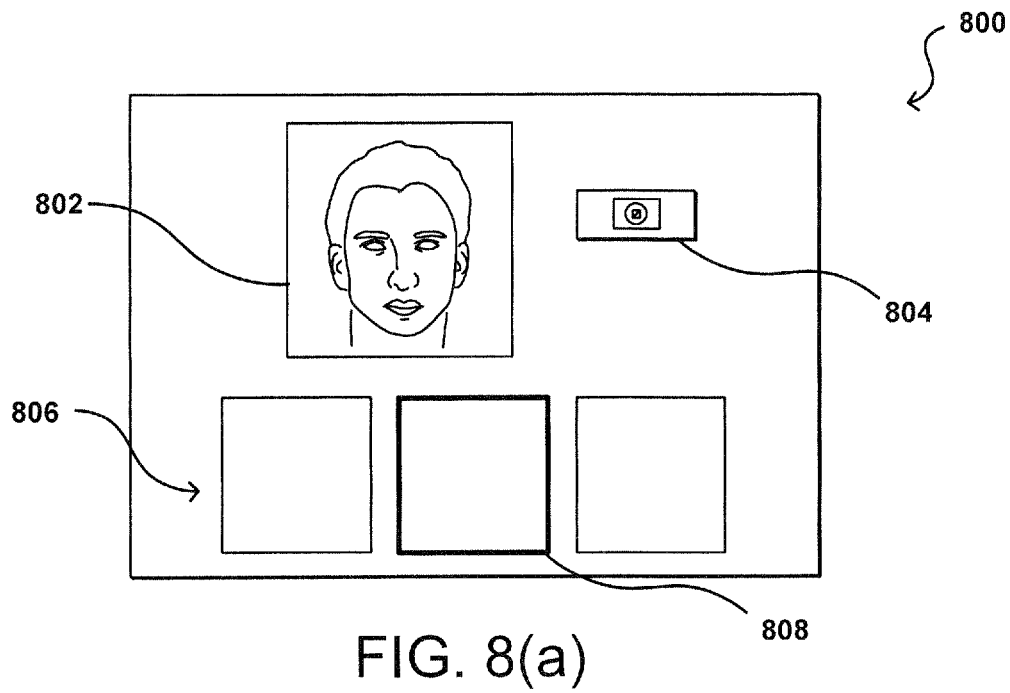
FIGS. 8(a), 8(b), 8(c), and 8(d) illustrate an example approach to assisting with the capturing of a lenticular image that can be used in accordance with various embodiments.

In addition to enabling the user to control the view of a lenticular image that is displayed on a computing device, approaches in accordance with various embodiments can also assist a user in capturing and/or generating such an image. As an example, FIG. 8(a) illustrates an example interface 800 that can be used to generate and/or update a lenticular image in accordance with various embodiments. In this example, there are three locations 806 that can be used to place an individual image in a lenticular, although other numbers of images in similar or different configurations can be used as well, and in at least some embodiments the user can have the ability to add, remove, or rearrange individual image locations for a particular lenticular. In this example, a central view location 808 is highlighted for placement of a default image, although other locations can be selected by default and/or the user can select different locations in which to place an image. In this example, the user can view an image 802 that can be placed in any of the locations 806. The image can be obtained in a number of different ways. For example, the image can correspond to a live view of a camera feed, and the user can select a shutter element 804 or other such input to cause the current frame or image to be acquired and placed in the selected location 808. Ways of acquiring images can include, for example, capturing, downloading, transferring, purchasing, creating, or combining images, among other such options. In another embodiment, the user might be able to select an input such as the shutter element 804 to cause an image to be captured, which then can be displayed to the user as a current image 802. The user can then drag or otherwise select the image 802 to be placed in the selected location 808, or potentially any of the other locations 806. Various other selection or manipulation options can be used as well within the scope of the various embodiments. In still other embodiments, a user might be able to paste, search for, select, browse, or otherwise identify a previously captured image, which can be selected as the current image 802 and used to fill in one or more of the view locations 808. Approaches to locating previously-captured images are well known in the art and, as such, will not be discussed in detail herein.

Figure 8B:
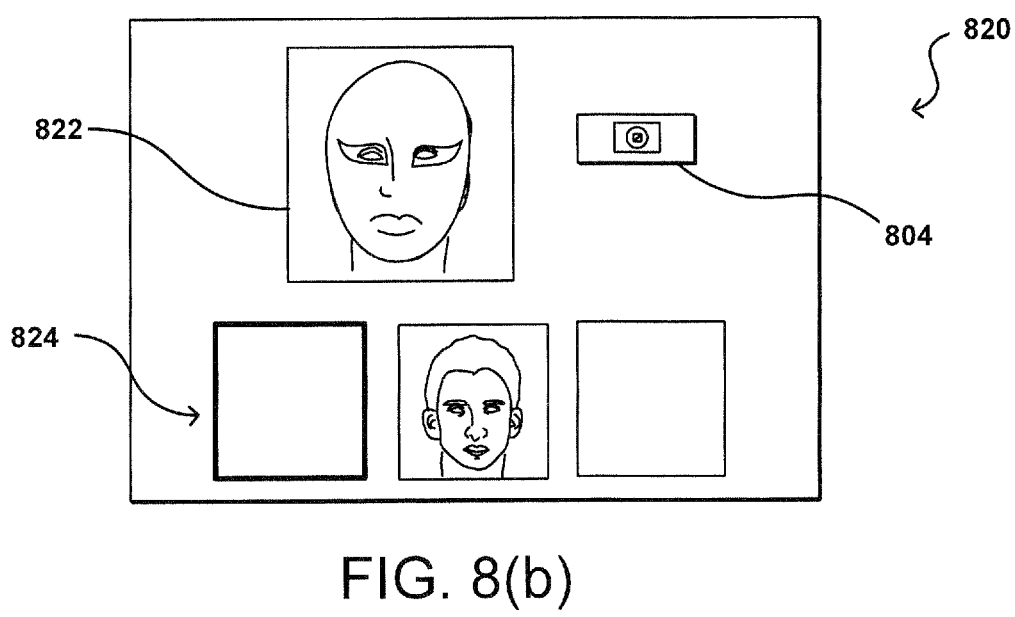
Figure 8C:
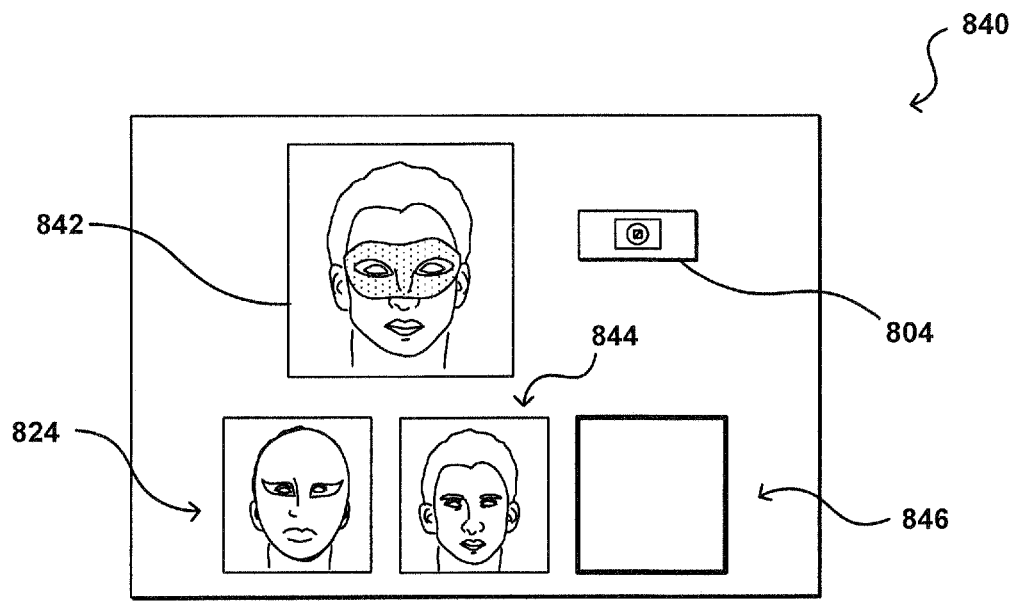

Once the user has placed the initial image, the user can attempt to identify, capture, acquire, or otherwise designate at least one additional image to be included as a view in the lenticular image. In the example situation 820 of FIG. 8(b), the user (or the software, etc.) can designate a new location 824 into which to place another image. As discussed previously, the user can obtain a new current image 822 through image capture, image location, or other such approaches. The user can then cause the second image 822 to be placed into a designated location 824 for the lenticular. In at least some embodiments, the user can have the option of dragging or otherwise moving images from one location to another until the user is satisfied with the relative locations of the individual images. FIG. 8(c) illustrates another example situation 840 wherein the user designates a third image 842 to be added to the lenticular, and can place the image in another designated location 846 such that the user can rotate between the first image 844, second image 824, and third image 842 according to the desired layout. When the lenticular image is saved, metadata or other information for the layout can be saved with the individual images into a single image of any appropriate format (e.g., JPEG, GIF, etc.). The image can be saved such that for any interface that does not support lenticular images the default view can be displayed or an animated image can be displayed, among other such options. For devices that support lenticular images through motion or other such control, information can be stored that designates the initial image, and then information for where each individual image or view should be considered with respect to the initial image. This can include data designating simple directions, such as "up," "down," "right," "left," or other directions, and can include angles or relative motions for each. For example, a default image might be designated, and a first image designated to be displayed when the device is rotated to the right by 5-10 degrees. Various other such instructions can be saved as well. In some embodiments, information for only the relative layout is stored, with the angular range controlled by the device, software, or user configuration or preferences, among other such options.

Figure 8D:
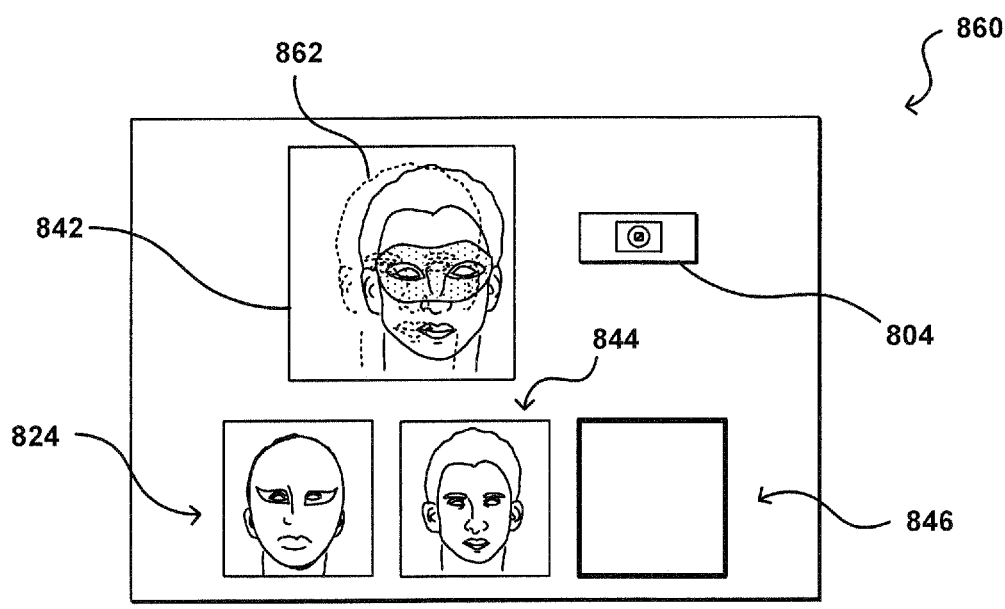

In situations where the user is capturing images to add to a lenticular, the interface can attempt to provide guidance in the capturing of the image(s). For example, in the interface 860 of FIG. 8(d), a semi-transparent view 862 of an earlier captured image is displayed. Different views can be used as well, such as an outline or bounding box generated based on one or more of the previous images. The use of such a guide can enable the user to align a new image to be captured, set the appropriate zoom and angle, etc., such that a more appropriate comparison can be made when switching between views. In at least some embodiments, the device can attempt to determine any misalignment between the current view and the previously-captured image and attempt to provide the user with guidance to align the images. This can include, for example, giving the user direction, rotation, tilt, and/or zoom instructions, among others. Suggested adjustments can be provided as well, such as by displaying an arrow indicating a suggested direction in which to move the device to capture the next image, among other such options.

In this example, the guide 862 corresponds to the default view of the user's head in the first image 844, although the user can have the option to select other images as guides in various embodiments. The guide can help the user to position the device such that the user's head with the mask is in substantially the same location in the camera's field of view, such that the location of the head will appear in substantially the same location between views. The user can always ignore and/or turn off the guide, if the user is not attempting to utilize aligned images for any particular reason. Various other approaches to assisting a user in aligning and/or capturing individual images can be utilized as well within the scope of the various embodiments.

Figure 9A:
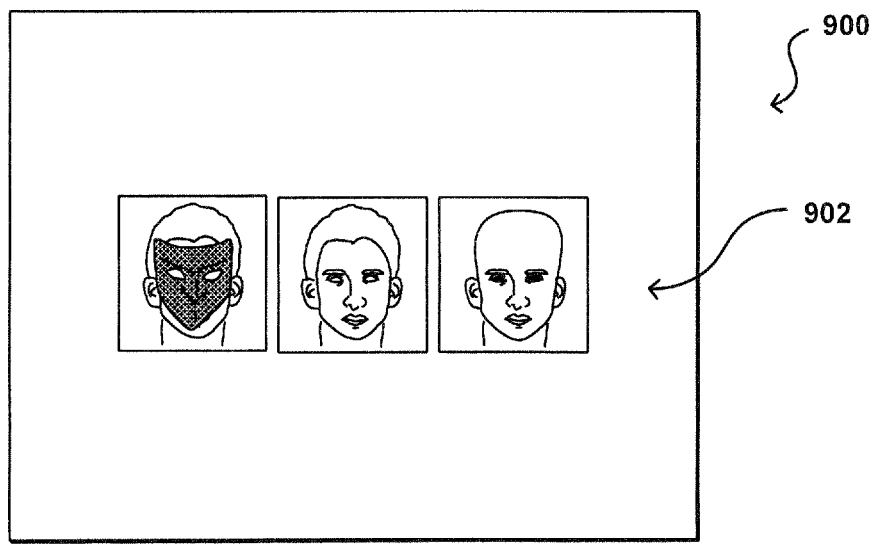
FIGS. 9(a), 9(b), 9(c), 9(d), 9(e), and 9(f) illustrate example configurations of images that can be used to generate lenticular images in accordance with various embodiments.
Figure 9B:
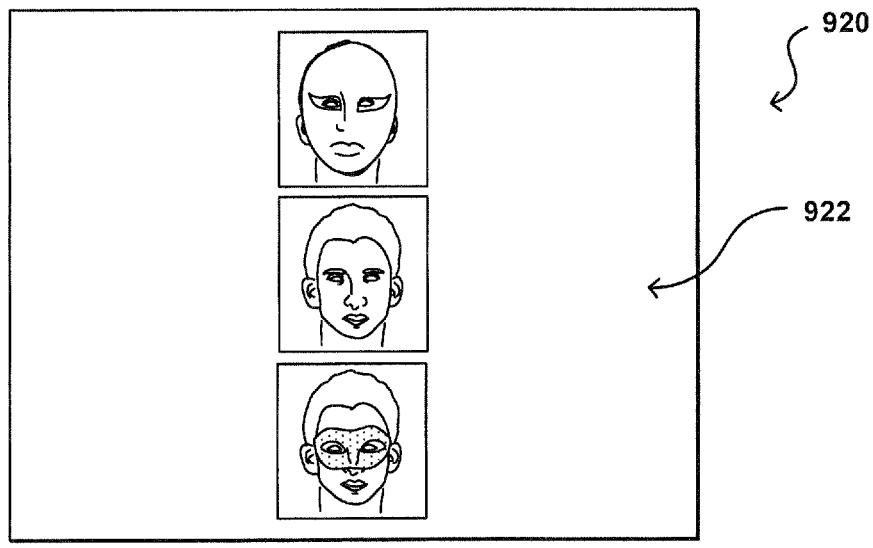
Figure 9C:
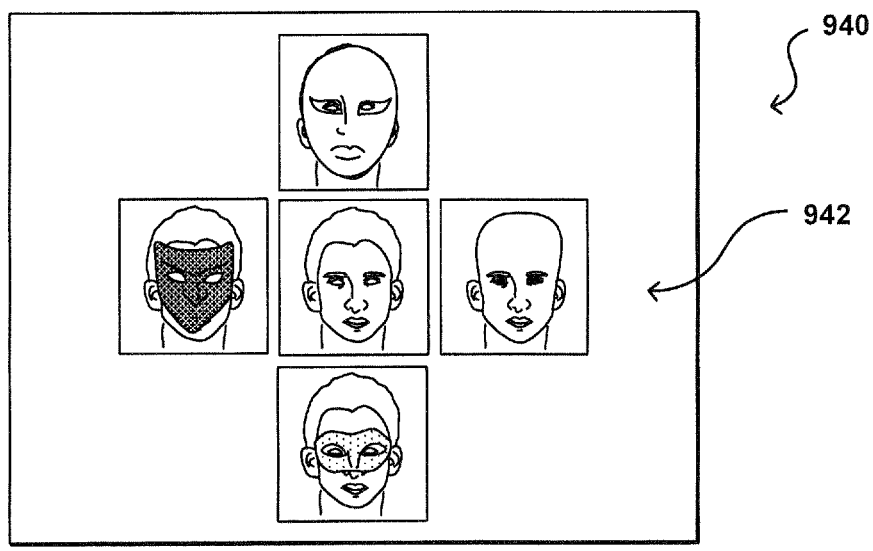

As discussed, individual images in a lenticular can be arranged in a number of different ways. For example, FIG. 9(a) illustrates an example configuration 900 wherein the individual images 902 of a lenticular are arranged in a horizontal row, whereby rotations or motions left and right can cause the view to change. In the example configuration 920 of FIG. 9(b), the images are arranged in a vertical column, such that rotations or motions in an up and down direction can cause the view to change. In the example configuration 940 of FIG. 9(c), the images 942 are positioned in a two-dimensional array, such that rotations or motions in either direction can cause the view to change. In situations where a square or rectangular array is utilized, for example, angled motions or other movements can be used to cause specific views to be displayed as well in accordance with various embodiments.

Figure 9D:
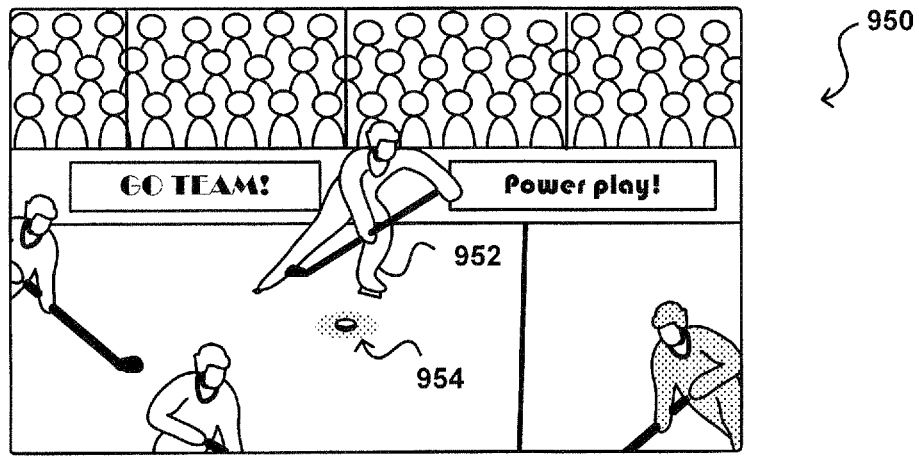
Figure 9E:
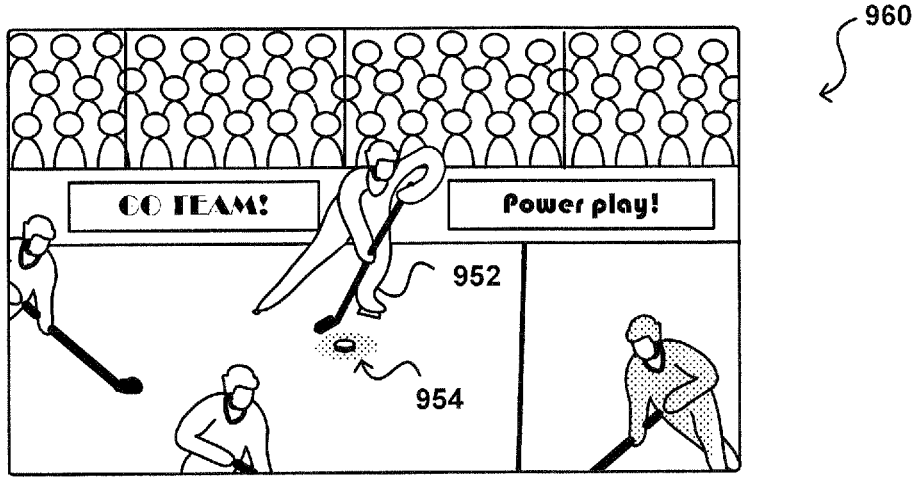
Figure 9F:
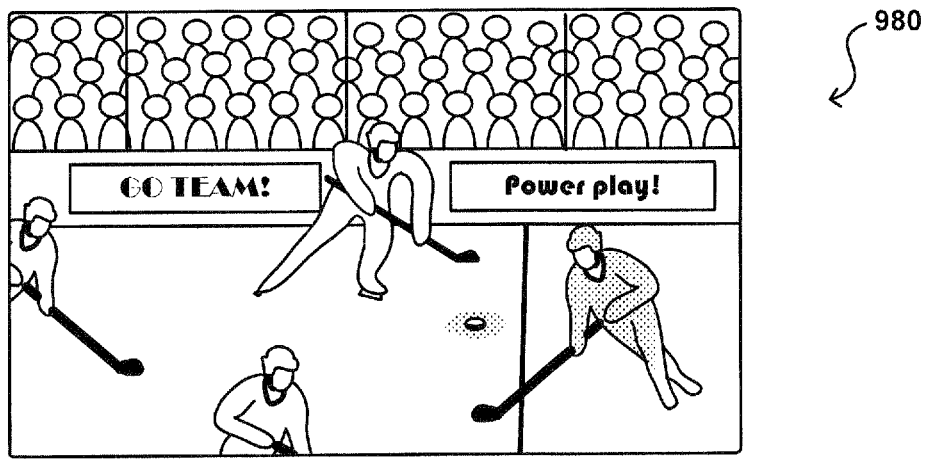

FIGS. 9(d) through 9(f) illustrate another example approach for capturing views for a lenticular that can be utilized in accordance with various embodiments. In this example, a user can utilize stop motion, multi-image capture, or video capture to capture action or motion, in this example corresponding to a player 952 hitting a hockey puck 954. As illustrated in the example situations 950, 960, 970 of FIGS. 9(d), 9(e), and 9(f) a series of images or video frames can be captured showing a change in position or motion of one or more objects in the scene. Using such an approach, a user can recreate the action by rotating the device in the appropriate direction, which allows the user to go as fast or slow as desired, as well as to reverse or move forward as desired. Such approaches can be useful for various action scenes, such as basketball shots, race finishes, and the like.

Figure 10A:
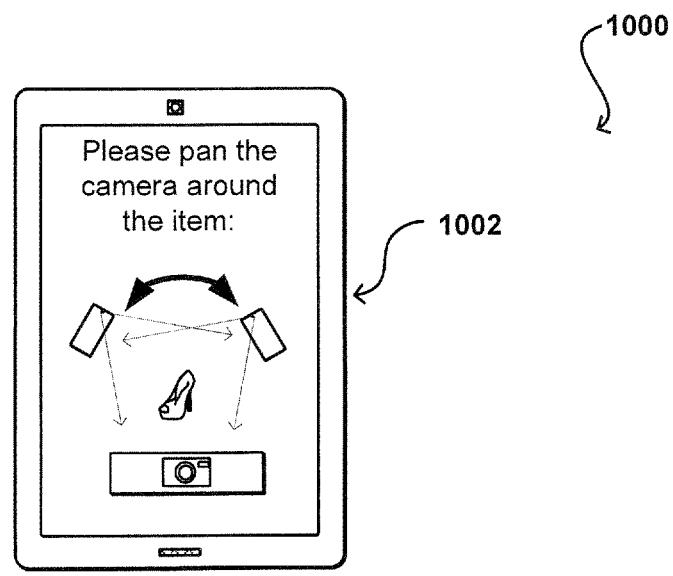
FIGS. 10(a) and 10(b) illustrate an example approach to creating a lenticular image that shows different angles of an object that can be used in accordance with various embodiments.
Figure 10B:
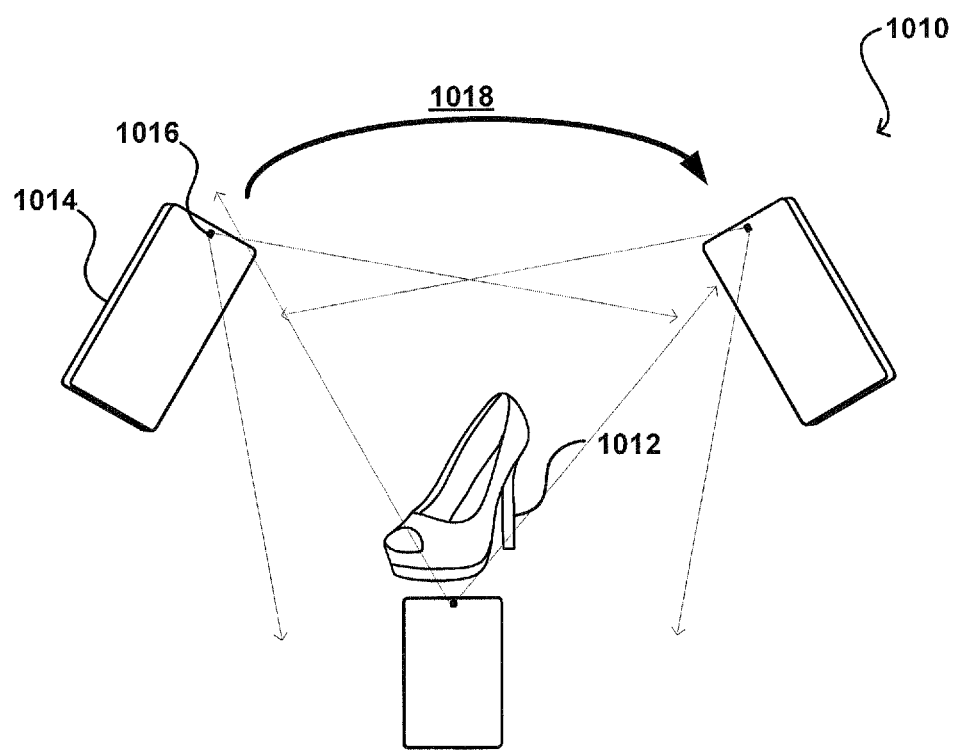

In some embodiments, a user can create a lenticular by initiating a lenticular capture process and then moving a computing device along a desired path to obtain the desired view(s). For example, consider the example situation 1000 of FIG. 10(a). In this example, the interface is providing guidance 1002 to a user to pan the device around an object. During the motion, the device can capture a series of images from which the user, software, or another such entity can select images to use as views in the lenticular. Alternatively, the device can capture video and frames of the video can be selected to use for the views of the lenticular. In at least some embodiments, sensor data for the device can be used to determine the relative orientation of the device for different images or frames, such as may help to assist in selecting images for the lenticular. For example, the process might want to select frames that are as close to thirty degrees apart as possible, based on one or more criteria or parameter values for the lenticular. In other embodiments the user can select images to capture while panning the device 1014 around the object 1012 along a desired path 1018 that keeps the object in a field of view of the capturing camera 1016, in accordance with at least some embodiments and as illustrated in the example situation 1010 of FIG. 10(b). In some embodiments, the sensor data can keep track of the path of motion and direct the user to move back to capture any images or views that were not obtained in the capture process. The data can also be stored with the image in order to allow a subsequent user to obtain a similar view of the object through similar motions or orientations. In this example, the device can pan all the way around the object, or at least substantially around the object, in order to generate a quasi-three dimensional representation of the object. As discussed, additional views can be generated through interpolation or blending, among other such options, to improve the three-dimensional experience. For some embodiments, the device might provide instructions as to how to move the device in order to capture the desired views. Various other such approaches can be utilized as well.

In some embodiments, an electronic compass might be sufficient for motion determinations, as the orientation relative to a fixed frame of reference (which is stationary relative to the surface of the earth) can be adequate to determine the orientation and/or path of the device. In many cases, however, the electronic compass will not be sensitive enough to detect small rotations or translations, such that it can be desirable to utilize one or more other motion or orientation sensors, such as a gyroscope or inertial sensor. Various other combinations can be used as well within the scope of the various embodiments.

Figure 11:
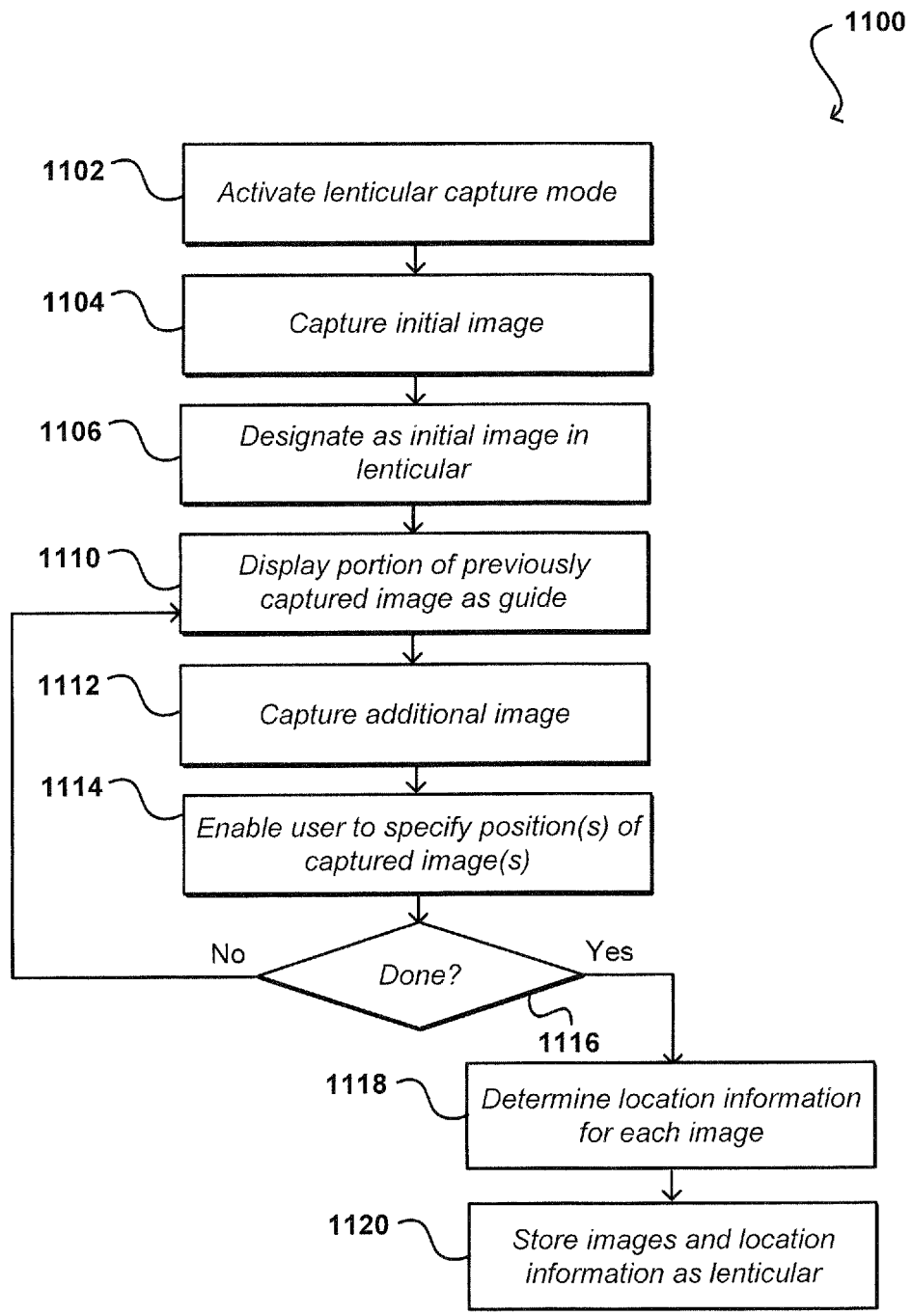
FIG. 11 illustrates an example process for assisting with the capture of lenticular images that can be used in accordance with various embodiments.

FIG. 11 illustrates an example process 1100 for assisting a user in capturing and/or generate a lenticular image in accordance with various embodiments. In this example, a lenticular (or other such) capture mode is activated 1102 on the computing device. When the user is ready to capture and an instruction or input is received, for example, an initial image can be captured 1104 or otherwise acquired. As discussed, a user can be able to capture images to add to a lenticular or select previously-acquired images, among other such options. In this example, the acquired image can be designated 1106 as the initial or default image, which can be displayed by default and/or when the device is in a default orientation. In order to assist with the aligning of subsequently captured images, at least a portion of the previously captured image can be displayed 1110 as a guide, such as by providing a partially transparent or outline view of an object in the previously captured image. An additional image can be captured 1112, and (if the user decides to utilize the image with the lenticular) the user can be enabled 1114 to specify the position of the captured image, which can include adjusting the position(s) of one or more other images in the lenticular.

If the user is not done adding images to the lenticular, the process can continue with the device displaying an alignment guide and the user acquiring and placing images in the lenticular layout. Once the user is determined to be done 1116 adding images, the device can determine 1118 the location of each of the images as placed by the user or otherwise designated. As discussed, this can include position information relative to the default image or another such location. The individual images and location information can then be stored 1120, locally, remotely, and/or temporarily, as a lenticular image of an appropriate format, which in at least some embodiments can be designated or selected by a user, application, or other such source.

Sensor data from one or more sensors on the device can also help with adjusting camera parameters such as auto focus, auto exposure, and auto white balance. For example, these values can be automatically set by the camera for each captured image. It can be desirable, however, to have each of the views have a relatively similar appearance, in at least some embodiments. Using sensor data can allow these settings to be dynamic, such that the computing device can determine how to best merge the images into the lenticular. Data such as the exposure and light settings can be stored for each image, and then used by the device (or a system or service in communication with the device) to determine how to best adjust the images together in the lenticular to provide a more uniform appearance.

In some embodiments, a service can enable a user to upload or otherwise provide images to be used to generate a lenticular image. For example, a user might offer to sell an item through an electronic marketplace. The user might upload multiple images of the item, which can then be used to generate a lenticular image of the item that can be displayed on the marketplace. A user interested in the item can then obtain multiple views of the item in order to assist the user in making a purchase decision, etc.

Figure 12:
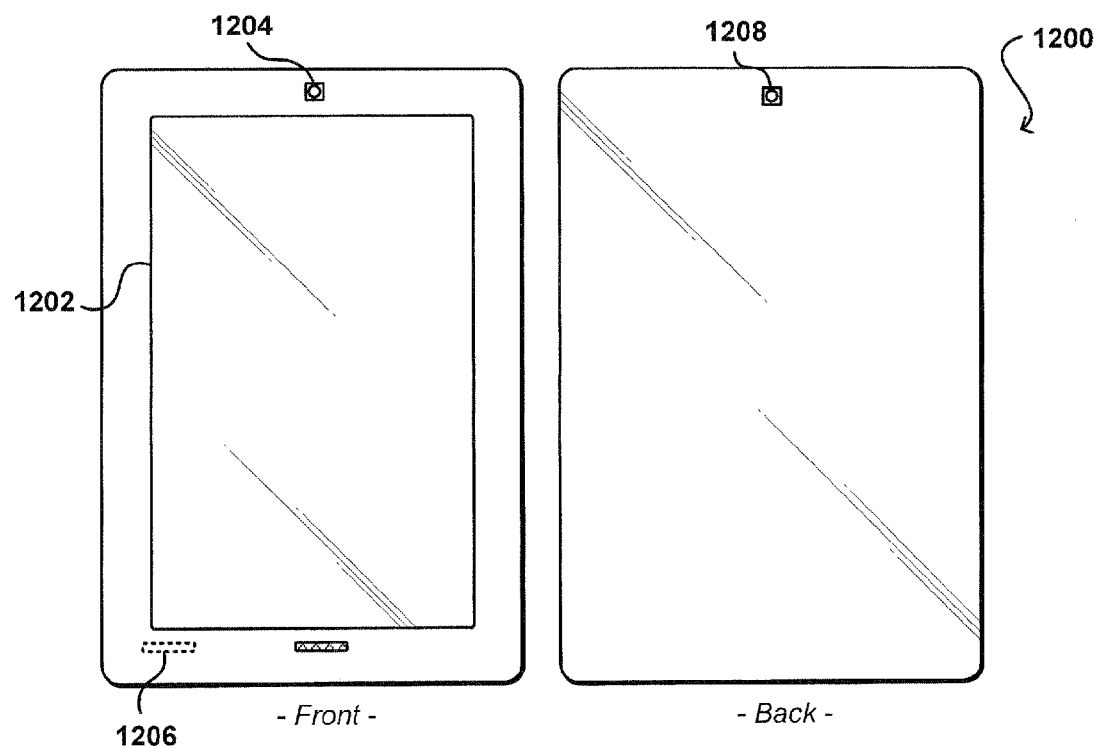
FIG. 12 illustrates front and back views of an example computing device that can be used in accordance with various embodiments.

FIG. 12 illustrates front and back views of an example computing device 1200 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

In this example, the computing device 1200 has a display screen 1202, which under normal operation will display information to a user (or viewer) facing the display screen (e.g., on the same side of the computing device as the display screen). The computing device in this example can include one or more image capture elements, in this example including an image capture element 1204 on the front of the device and an image capture element 1206 on the back of the device, although it should be understood that additional or fewer image capture elements could be used, and could also, or alternatively, be placed on the sides, corners, or other locations on the device. The image capture elements also can be of similar or different types. Each image capture element may be, for example, a camera, a charge-coupled device (CCD), a motion detection sensor or an infrared sensor, or can utilize other image capturing technology. The computing device can also include at least one microphone or other audio capture element capable of capturing audio data. As discussed herein, the device can include one or more motion and/or orientation-determining elements, such as may include an electronic compass 1206 and an electronic gyroscope 1208, as well as an accelerometer, inertial sensor, barometer, global positioning sensor, proximity sensor, and the like, which can assist with movement and/or orientation determinations.

Figure 13:
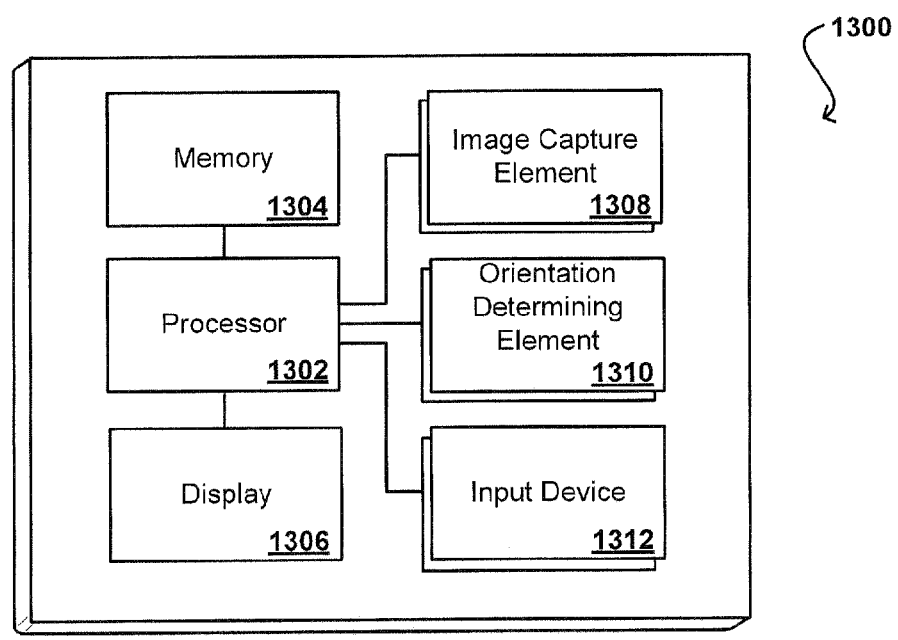
FIG. 13 illustrates example components of a computing device such as that illustrated in FIG. 12.

FIG. 13 illustrates a set of basic components of a computing device 1300 such as the device 1200 described with respect to FIG. 12. In this example, the device includes at least one processor 1302 for executing instructions that can be stored in a memory device or element 1304. As would be apparent to one of ordinary skill in the art, the device can include many types of memory, data storage or computer-readable media, such as a first data storage for program instructions for execution by the at least one processor 1302, the same or separate storage can be used for images or data, a removable memory can be available for sharing information with other devices, and any number of communication approaches can be available for sharing with other devices. The device typically will include at least one type of display element 1306, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1308, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one motion and/or orientation determining element 1310, such as an accelerometer, digital compass, electronic gyroscope, or inertial sensor, which can assist in determining movement or other changes in orientation of the device. The device can include at least one additional input device 1312 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 14:
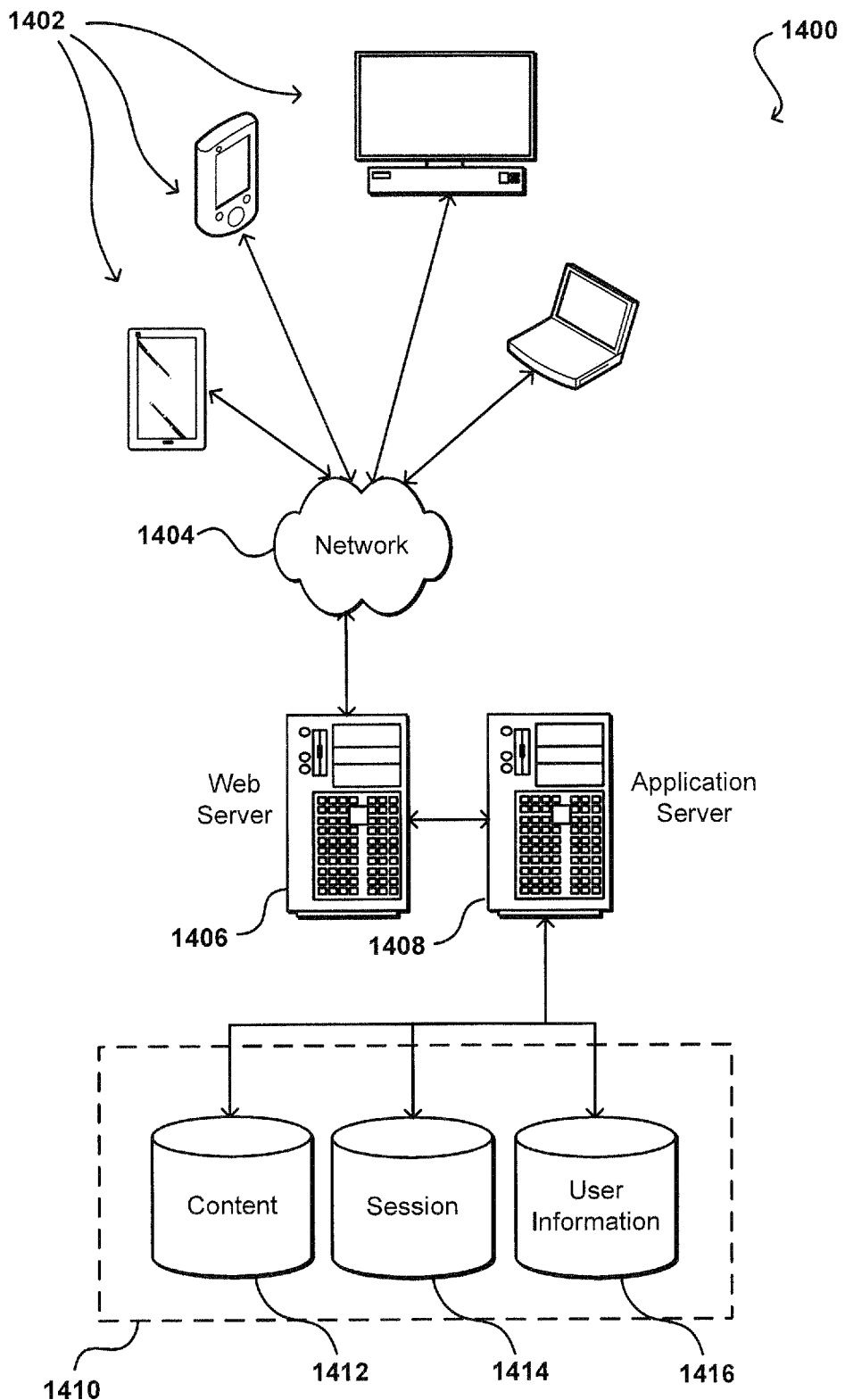
FIG. 14 illustrates an environment in which various embodiments can be implemented.

As discussed, different approaches can be implemented in various environments in accordance with the described embodiments. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The system includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1406 for receiving requests and serving content in response thereto, although for other networks, an alternative device serving a similar purpose could be used, as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1406 in the form of HTML, XML or another appropriate structured language in this example. The handling of all requests and responses, as well as the delivery of content between the client device 1402 and the application server 1408, can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing content (e.g., production data) 1412 and user information 1416, which can be used to serve content for the production side. The data store is also shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    at least one processor;
    a camera;
    a display screen; and
    memory including instructions that, when executed by the at least one processor, cause the computing device to:
        acquire a first image using the camera;
        designate the first image as a default view for a lenticular image;
        display, on the display screen along with a live view of image data captured by the camera, a representation of the first image, the representation enabling a user of the computing device to align at least one object in the live view with an object in the first image;
        acquire a second image using the camera;
        enable the user to designate a view direction for the second image with respect to the first image, the view direction including at least an up, down, right, and left view direction; and
        store information for the first image, the second image, the default view, and the view direction as the lenticular image.

2. The computing device of claim 1, wherein the instructions when executed further cause the computing device to:
    enable the user to change the second image to be the default view.

3. The computing device of claim 1, wherein the instructions when executed further cause the computing device to:
    cause a selected representation of the first image or the second image to be displayed along with the live view;
    acquire a third image using the camera; and
    enable the user to specify relative view directions between the first image, the second image, and the third image, each relative view direction indicating a change in orientation needed to display a respective image of the first image, the second image, and the third image.

4. The computing device of claim 1, wherein the instructions when executed further cause the computing device to:
    receive a selection of a previously-captured image; and
    enable the user to specify a relative view direction for adding the previously-captured image to the lenticular image.

5. The computing device of claim 1, wherein the lenticular image is capable of including a plurality of views each corresponding to a respective image, and wherein each view of the plurality of views has information for at least one view direction with respect to another view of the plurality of views.

6. A computer-implemented method, comprising:
    acquiring a first image;
    designating the first image as a default view a lenticular image;
    acquiring a second image;
    designating the second image as a second view having at least one view direction with respect to the default view including at least an up, down, right, and left view direction, the at least one view direction specifying a direction of motion for causing the second view to be displayed; and
    storing information for the default view, the second view, and the at least one view direction as the lenticular image.

7. The computer-implemented method of claim 6, further comprising:
    capturing the first image using a camera of a computing device; and
    displaying information from the first image on a display of the computing device as a guide for capturing the second image using the camera.

8. The computer-implemented method of claim 6, wherein at least one of the first image or the second image is acquired through specification by the user of a previously-captured image.

9. The computer-implemented method of claim 6, further comprising:
    causing a selected representation of the first image or the second image to be displayed on a display of the computing device;
    acquiring, using the selected representation as a guide, a third image; and
    enabling the user to specify relative view directions between the first image, the second image, and the third image, each relative view direction indicating a change in orientation needed to display a respective image of the first image, the second image, and the third image.

10. The computer-implemented method of claim 6, wherein each image of the first image and the second image are frames of video captured by a camera of the computing device.

11. The computer-implemented method of claim 6, further comprising:
    displaying a guide to assist the user in positioning the computing device to capture the second image.

12. The computer-implemented method of claim 6, further comprising:
assigning an angular range to the second image, wherein the second image is displayed when a computing device displaying the lenticular image has a change in orientation in the at least one view direction within the assigned angular range.

13. The computer-implemented method of claim 6, further comprising:
enabling the user to at least one of add, remove, replace, or rearrange images in the lenticular image.

14. The computer-implemented method of claim 6, further comprising:
configuring the lenticular image such that an interface not supporting multiple views of the lenticular image is able to display at least the default view or an animated view.

15. The computer-implemented method of claim 6, further comprising:
enabling a plurality of images to be stored as views in the lenticular image with view directions along at least two axes.

16. A non-transitory computer-readable storage medium storing instructions that, when executed by at least one processor of a computing device, cause the computing device to:
acquire a first image;
acquire a second image;
designate the second image as a second view having at least one view direction including at least an up, down, right, and left view direction with respect to a first view corresponding to the first image, the at least one view direction specifying a direction of motion for causing the second view to be displayed; and
store information for the first view, the second view, and the at least one view direction as the lenticular image.

17. The non-transitory computer-readable storage medium of claim 16, wherein the instructions when executed further cause the computing device to:
capture the first image using a camera of a computing device; and
display information from the first image on a display of the computing device as a guide for capturing the second image using the camera.

18. The non-transitory computer-readable storage medium of claim 16, wherein the instructions when executed further cause the computing device to:
cause a selected representation of the first image or the second image to be displayed on a display of the computing device;
acquire, using the selected representation as a guide, a third image; and
enable the user to specify relative view directions between the first image, the second image, and the third image, each relative view direction indicating a change in orientation needed to display a respective image of the first image, the second image, and the third image.

19. The non-transitory computer-readable storage medium of claim 16, wherein the instructions when executed further cause the computing device to:
determine a path of motion of the computing device using at least one device sensor; and
provide guidance to the user regarding a deviation of the path of motion from a predetermined path for capturing images to be included as views in the lenticular image.

20. The non-transitory computer-readable storage medium of claim 16, wherein the instructions when executed further cause the computing device to:
assign an angular range to the second image, wherein the second image is displayed when a computing device displaying the lenticular image has a change in orientation in the at least one view direction within the assigned angular range.

* * * * *